(12) United States Patent
Barraclough et al.

(10) Patent No.: US 9,317,264 B2
(45) Date of Patent: *Apr. 19, 2016

(54) EXECUTION CONTROL DURING PROGRAM CODE CONVERSION

(71) Applicant: International Business Machines Corporation, Armonk, NY (US)

(72) Inventors: Gavin Barraclough, Manchester (GB); Kit Man Wan, Oldham (GB); ALexander B. Brown, Sheffield (GB); David N. MacKintosh, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,486

(22) Filed: Dec. 23, 2013

(65) Prior Publication Data
US 2014/0137089 A1    May 15, 2014

Related U.S. Application Data

(63) Continuation of application No. 13/139,047, filed on May 27, 2005, now Pat. No. 8,615,749.

(30) Foreign Application Priority Data

Mar. 11, 2005 (GB) .................................. 0505042.2

(51) Int. Cl.
*G06F 9/45* (2006.01)
*G06F 9/455* (2006.01)

(52) U.S. Cl.
CPC ............ *G06F 8/443* (2013.01); *G06F 9/45516* (2013.01)

(58) Field of Classification Search
None
See application file for complete search history.

(56) References Cited

U.S. PATENT DOCUMENTS

| | | | | |
|---|---|---|---|---|
| 5,590,332 A | * | 12/1996 | Baker | G06F 12/0253 707/999.202 |
| 6,205,545 B1 | * | 3/2001 | Shah | G06F 9/3802 712/237 |
| 7,805,710 B2 | * | 9/2010 | North | G06F 9/45516 711/118 |
| 2002/0100030 A1 | * | 7/2002 | Souloglou | G06F 8/44 717/146 |
| 2003/0088862 A1 | * | 5/2003 | Ramasamy | G06F 9/30054 717/158 |
| 2005/0015758 A1 | * | 1/2005 | North | G06F 9/45516 717/138 |

* cited by examiner

*Primary Examiner* — Evral E Bodden
(74) *Attorney, Agent, or Firm* — Thomas E. Tyson; Gregory K. Goshorn; Greg Goshorn, P.C.

(57) ABSTRACT

Execution control techniques are described for use in a translator that converts subject code into target code. The translator includes a translator trampoline function that is called from a translator run loop and which in turn calls either to a translator code generator to generate target code, or else calls previously generated target code for execution. Control then returns to the translator trampoline function to make a new call, or returns to the translator run loop. Other aspects include making context switches through the trampoline function and setting first and second calling conventions either side of the trampoline function. Jumping directly or indirectly between target code blocks during execution is also described.

20 Claims, 14 Drawing Sheets

Figure 8

| 1st calling convention | | | 2nd calling convention | |
|---|---|---|---|---|
| role | preservation | | preservation | role |
| general purpose | scratch | eax | scratch | *parameter_1* |
| general purpose | scratch | ecx | scratch | general purpose |
| general purpose | scratch | edx | scratch | general purpose |
| general purpose | callee | ebx | scratch | general purpose |
| stack pointer | callee | esp | callee | stack pointer |
| base pointer | callee | ebp | callee | *parameter_2* |
| general purpose | callee | esi | scratch | general purpose |
| general purpose | callee | edi | scratch | general purpose |

EXECUTION CONTROL DURING PROGRAM CODE CONVERSION

CROSS-REFERENCES TO RELATED APPLICATIONS

The present application is a continuation and claims the benefit of the priority date of an application entitled, "Execution Control During Program Code Conversion" Ser. No. 11/139,047, filed May 27, 2005, assigned to the assignee of the present application, and herein incorporated by reference.

FIELD OF DISCLOSURE

The claimed subject matter relates in general to the field of computers and computer software and, more particularly, to program code conversion techniques useful, for example, in code translators, emulators and accelerators which convert program code.

BACKGROUND OF THE INVENTION

In both embedded and non-embedded CPUs, there are predominant Instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such CPUs would benefit from a software-oriented processor co-architecture.

Program code conversion methods and apparatus to facilitate such acceleration, translation and co-architecture capabilities are disclosed, for example, in published PCT application WO00/22521, and others.

SUMMARY

In accordance with the claimed subject matter is provided an apparatus and method as set forth in the appended claims. Preferred features of the invention will be apparent from the dependent claims, and the description which follows.

The following is a summary of various aspects and advantages realizable according to embodiments according to the disclosed techniques. It is provided as an introduction to assist those skilled in the art to more rapidly assimilate the detailed design discussion that ensues and does not and is not intended in any way to limit the scope of the claims that are appended hereto.

In particular, the inventors have developed an optimization technique directed at expediting program code conversion, and which is particularly useful in connection with a run-time translator which employs translation of subject program code into target code.

One advantage achievable according to embodiments described below is the reduction in overhead associated with performing context switches wherein a host CPU switches between execution of a translator program and execution of translated code, particularly during dynamic translation. Thus, improved performance of a translator when undertaking program code conversion is achieved.

In a first aspect of the claimed subject matter there is provided a technique for execution control when converting subject code into target code including providing a translator trampoline function which is called from a translator run loop and which in turn calls either to a translator code generator to generate additional target code, or else calls previously generated target code for execution. Control then returns to the translator trampoline function to make a new call, or returns to the translator run loop through the trampoline function.

Preferably, first and second calling conventions are applied either side of the trampoline function. Altering the calling convention allows parameters to be passed such as between the translator code generator function and the executed target code, particularly by using target processor registers. The parameters preferably include block identifiers referring to a current block of subject code and/or parameters concerning a subject processor state.

Preferably, the trampoline function also performs a processor mode switch of the target processor, such as between first and second modes. Suitably, the first mode is applied when calling the translator generator function (i.e. a translator context), and the second, different, mode is applied for execution of the generated target code.

Another preferred aspect of the claimed subject matter allows jumping from a first target code block to a subsequent block either indirectly through the translator trampoline function, or directly from block to block. Preferably, the method includes generating each target code block with tail instructions to provide a linking parameter. The linking parameter links to the subsequent block, such as by linking to a memory address where the subsequent block is stored, or where a block object is stored representing the subsequent block. In one embodiment, the linking parameter is used an operand in a jump instruction.

In another aspect of the present claimed subject matter, the preferred techniques includes providing a second translator trampoline function nested within a first translator trampoline function. Preferably, the second trampoline function is called from an executing target code block, which in turn calls a nested translator function to generate additional target code.

In still another aspect of the claimed subject matter, the preferred technique includes performing a profiling check to determine whether execution control will remain with the target code, or return to the translator run loop. The profiling check is applied particularly when jumping between target code blocks. Preferably, the profiling check includes maintaining a counter value for executions of a target code block and comparing the counter value against a predetermined threshold. Once the target code has repeated a predetermined number of times, execution control is forced back to the translator run loop.

The claimed subject matter also extends to a computer-readable storage medium having recorded thereon program software to execute the methods described herein. Further, the present invention extends to a computer processor in combination with such software, such as in a translator apparatus or other computing machine.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

The accompanying drawings, which are incorporated in and constitute a part of the specification, illustrate presently preferred implementations and are described as follows:

FIG. 8 illustrates a preferred method employing first and second calling conventions during program code conversion;

DETAILED DESCRIPTION

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved program code conversion method and apparatus.

In the terminology below, a subject program is intended to execute on a subject computing platform including a subject processor. A target computing platform including a target processor is used to execute the subject program, through a translator which performs dynamic program code conversion. The translator performs code conversion from subject code to target code, such that the target code is executable on the target computing platform.

Figure 1:
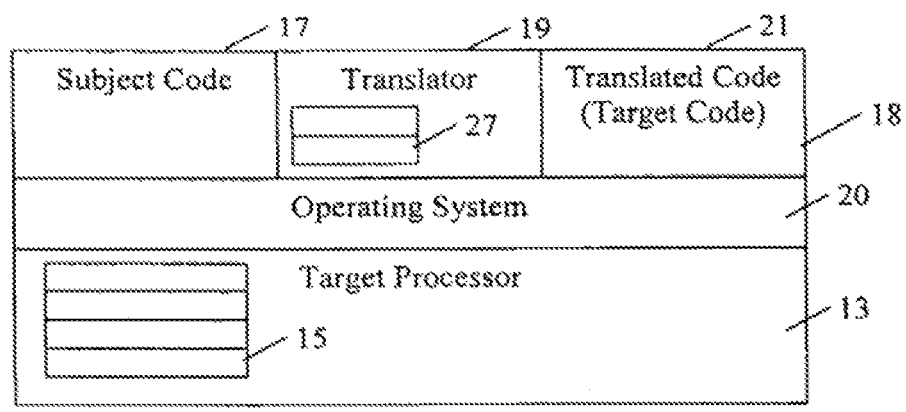
FIG. 1 is a schematic diagram of an illustrative computing environment illustrating translation of subject code to target code.

FIG. 1 illustrates a target computing platform comprising a target processor 13 having a plurality of target registers 15, and a memory 18 to store a plurality of software components 17, 19, 20, 21, and 27. The software components include an operating system 20, subject code 17, translator code 19, and translated target code 21.

In one embodiment, the translator code 19 is an emulator to translate subject code of a subject ISA into translated target code of another ISA, with or without optimizations. In another embodiment, the translator code functions as an accelerator for translating subject code into target code, each of the same ISA.

The translator 19, i.e., the compiled version of source code implementing the translator, and the translated code 21, i.e., the translation of the subject code 17 produced by the translator 19, run in conjunction with the operating system 20 running on the target processor 13, which is typically a microprocessor or other suitable computer.

It will be appreciated that the structure illustrated in FIG. 1 is exemplary only and that, for example, software, methods and processes according to the invention may be implemented in code residing within or beneath an operating system. The subject code 17, translator code 19, operating system 20, and storage mechanisms of the memory 18 may be any of a wide variety of types, as known to those skilled in the art.

Interleaved Code Execution

In the apparatus according to FIG. 1, program code conversion is preferably performed dynamically, at run-time, while the target code 21 is running. The translator 19 runs inline with the translated program 21. The translator 19 is preferably employed as an application compiled for the target architecture. The subject program 17 is translated by the translator 19 at run-time to execute on the target architecture.

Running the subject program 17 through the translator 19 involves two different types of code that execute in an interleaved manner; the translator code 19; and the target code 21. The translator code 19 is generated such as by a compiler, prior to run-time, based on a high-level source code implementation of the translator 19. By contrast, the target code 21 is generated by the translator code 19, throughout run-time, based on the stored subject code 17 of the program being translated.

The subject program 17 is intended to run on a subject processor (not shown). In one embodiment, the translator 19 functions as an emulator. That is, the translator 19 emulates the subject processor, whilst actually executing the subject program 17 as target code 21 on the target processor 13. In the preferred embodiment, at least one global register store 27 is provided (also referred to as the subject register bank 27). In a multiprocessor environment, optionally more than one abstract register bank 27 is provided according to the architecture of the subject processor. A representation of a subject processor state is provided by components of the translator 19 and the target code 21. That is, the translator 19 stores the subject processor state in a variety of explicit programming language devices such as variables and/or objects; the compiler used to compile the translator determines how the state and operations are implemented in target code. The target code 21, by comparison, provides subject processor state implicitly in the target registers 15 and in memory locations 18, which are manipulated by the target instructions of the target code 21. For example, the low-level representation of the global register store 27 is simply a region of allocated memory. In the source code of the translator 19, however, the global register store 27 is a data array or an object which can be accessed and manipulated at a higher level.

Figure 2:
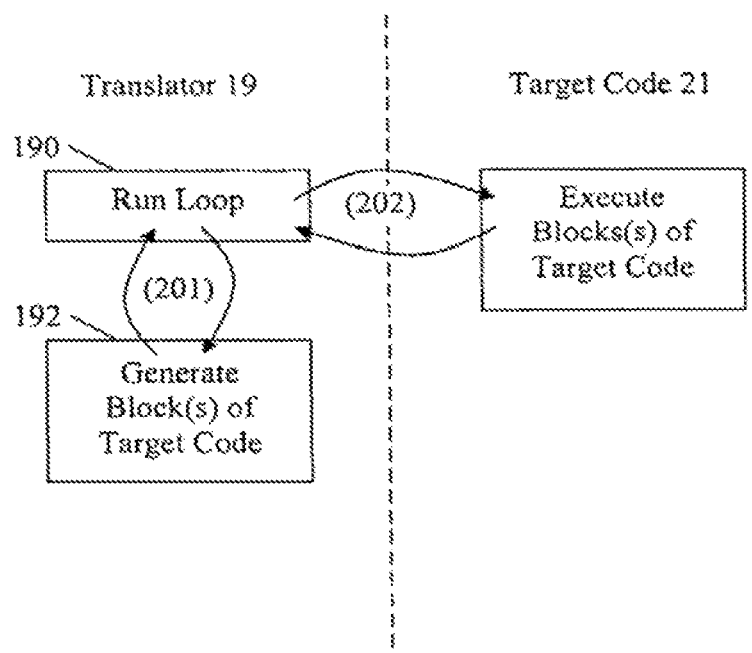
FIG. 2 is a schematic flow diagram illustrating an example method of execution control during program code conversion.

FIG. 2 is a schematic flow diagram illustrating an example method of execution control during program code conversion.

As shown in FIG. 2, control initially resides with a translator control loop 190. In step 201, the control loop 190 calls a code generation function 192 of the translator code 19, which translates a block of the subject code 17 into a corresponding block of translated code 21. Then in step 202, that block of translated code 21 is executed on the target processor 13. Conveniently, the end of each block of translated code 21 contains instructions to return control back to the control loop 201. In other words, the steps of translating and executing the subject code are interlaced, such that portions of the subject program 17 are translated and then executed in turn.

Here, the term "basic block" will be familiar to those skilled in the art. A basic block is defined as a section of code with exactly one entry point and exactly one exit point, which limits the block code to a single control path. For this reason, basic blocks are a useful fundamental unit of control flow. Suitably, the translator 19 divides the subject code 17 into a plurality of basic blocks, where each basic block is a sequential set of instructions between a first instruction at a unique entry point and a last instruction at a unique exit point (such as a jump, call or branch instruction). The translator may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions.

In the preferred embodiments, IR trees are generated based on a subject instruction sequence, as part of the process of generating the target code 21 from the original subject program 17. IR trees are abstract representations of the expressions calculated and operations performed by the subject program. Later, the target code 21 is generated based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract register definitions which correspond to specific features of the subject architecture upon which the subject program 17 is intended to run. For example, there is a unique abstract register definition for each physical register on the subject architecture ("subject register"). As such, abstract register definitions in the translator may be implemented as a C++ object which contains a reference to an IR node object (i.e., an IR tree). The aggregate of all IR trees referred to by the set of abstract register definitions is referred to as the working IR forest ("forest" because it contains multiple abstract register roots, each of which refers to an IR tree).

These IR trees and other processes form part of the translator code generation function 192.

An example of execution control during program code conversion will now be explained further with reference to FIGS. 3 & 4, in order to better understand the background to the present invention and the problems addressed.

Figure 3:
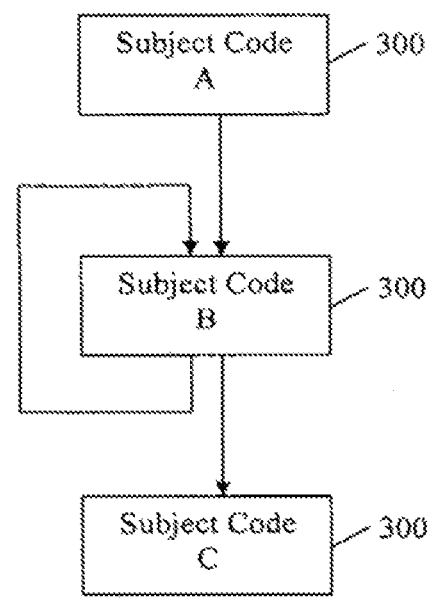
FIG. 3 is a schematic representation showing an example of a subject program.

FIG. 3 is a schematic representation showing functional sections 300 of a subject program 17. The sections are labelled as blocks A, B & C with arrows therebetween representing subject program flow. In this example, block B comprises a looping structure involving a decision either to loop back within block B or else continue to block C.

Figure 4:
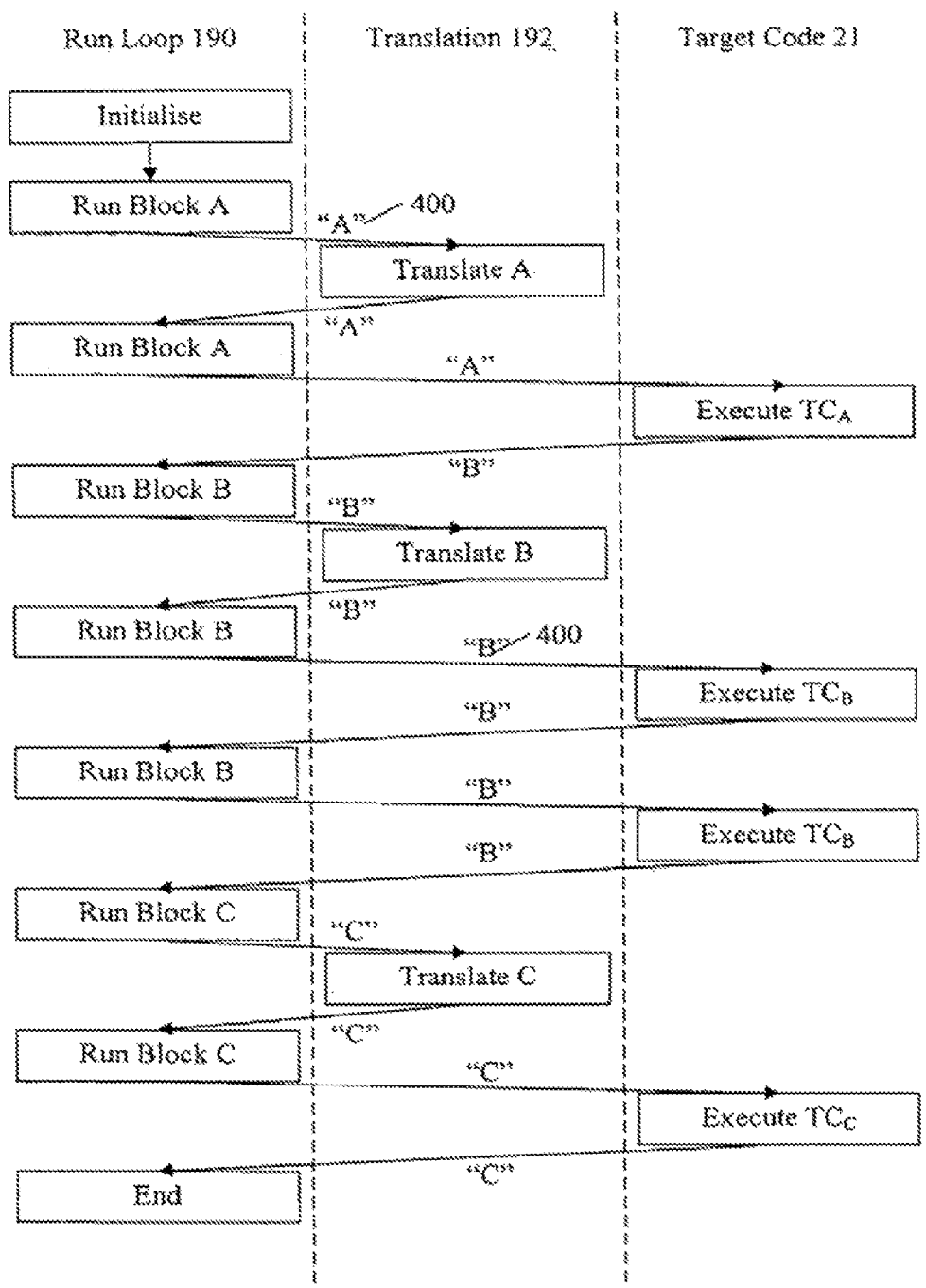
FIG. 4 is a schematic representation of execution control in a target architecture.

FIG. 4 is a schematic representation of execution control in the target architecture. Program flow runs down the diagram, whilst the columns show execution control passing between execution of the translator 19 and execution of the translated code 21.

The translator 19 suitably includes a run loop 190 to control operation of the translator and target code execution. The run loop 190 calls either to previously translated target code 21 (e.g. TC.sub.A, TC.sub.B or TC.sub.C) stored in the memory 18, or else calls a translator code generator function 192 to generate such translated target code from the corresponding block of subject code A, B or C stored in the memory 18. One or more parameters 400 are passed between these functions during execution, in particular denoting the current block under consideration (A, B or C) and information about the subject processor state.

Several problems have been identified with the execution control structure shown in FIG. 4.

Firstly, the execution path is non-linear and there are many jumps to an arbitrary location in memory. In particular, execution frequently switches between the run loop 190, the code generator 192 and the target code 21, with the jump determined in part by a parameter denoting the current block (A, B or C). These jumps are not accurately predictable, which significantly reduces effectiveness of prediction enhancements in many processor architectures.

Further, each switch between translation and target code execution involves significant work. As will be explained in more detail below, such a context switch typically includes saving or restoring of registers such as into the global register store 27 in order to meet predetermined conditions and achieve a settled state. Typically the context switch requires execution of ten or more instructions by the target processor 13. A basic block A, B, or C might itself only contain five to ten instructions, and so it will be appreciated that each context switch adds significantly to the work required of the target architecture.

Context Switching

Switching between execution of the translator 19 and execution of the target code 21 is referred to herein as a context switch. Each block of target code 21 is executed based on a set of assumptions as to the state of the target processor 13 and the memory 18. Similarly, execution of the translator 19 adheres to assumptions as to the state of the target machine. In particular, a calling convention is defined to determine attributes such as register roles and/or register preservation.

With respect to register roles, particular registers are commonly allocated specific roles. Various general purpose registers may also be provided. For example, in commonly used calling conventions for the x86 processor architecture, a register ESP is defined as the stack pointer, and a register EBP is defined as the frame/base pointer. These and other roles form part of the calling convention for that ISA and processor, and enable code execution to function effectively.

Register preservation defines which register contents should be preserved (e.g. by saving to a stack and then restoring) and which can be safely ignored (e.g. scratch or temporary registers) when moving through execution of different sections of program code on the target machine.

For example, x86 processors have eight registers. In a standard calling convention commonly employed on x86 processors, the registers EAX, ECX and EDX are scratch and do not need to be preserved across a function call, i.e. these are caller preserved. By contrast, EBX, ESP, EBP, ESI & EDI are callee preserved. That is, these registers must be pushed to the stack upon entry into a called block of code and then popped from the stack upon exit, in order to save and restore their contents across a call. The callee preserved registers add overhead both to storage and to execution of each block of target code 21. That is, the translator 19 adds extra instructions at the beginning and at the end of each generated block of target code 21, to perform the register save and restore operations required by the calling convention. This is in addition to the useful instructions of the target block which replicate the equivalent block of subject code.

Other processors have 16, 32, 64 or more registers, and hence involve increased workload particularly for callee preserved registers.

It will be appreciated that each context switch requires significant work by the target architecture and inevitably introduces a time delay, thus slowing execution of the subject program 17 through the translator 19.

Figure 5:
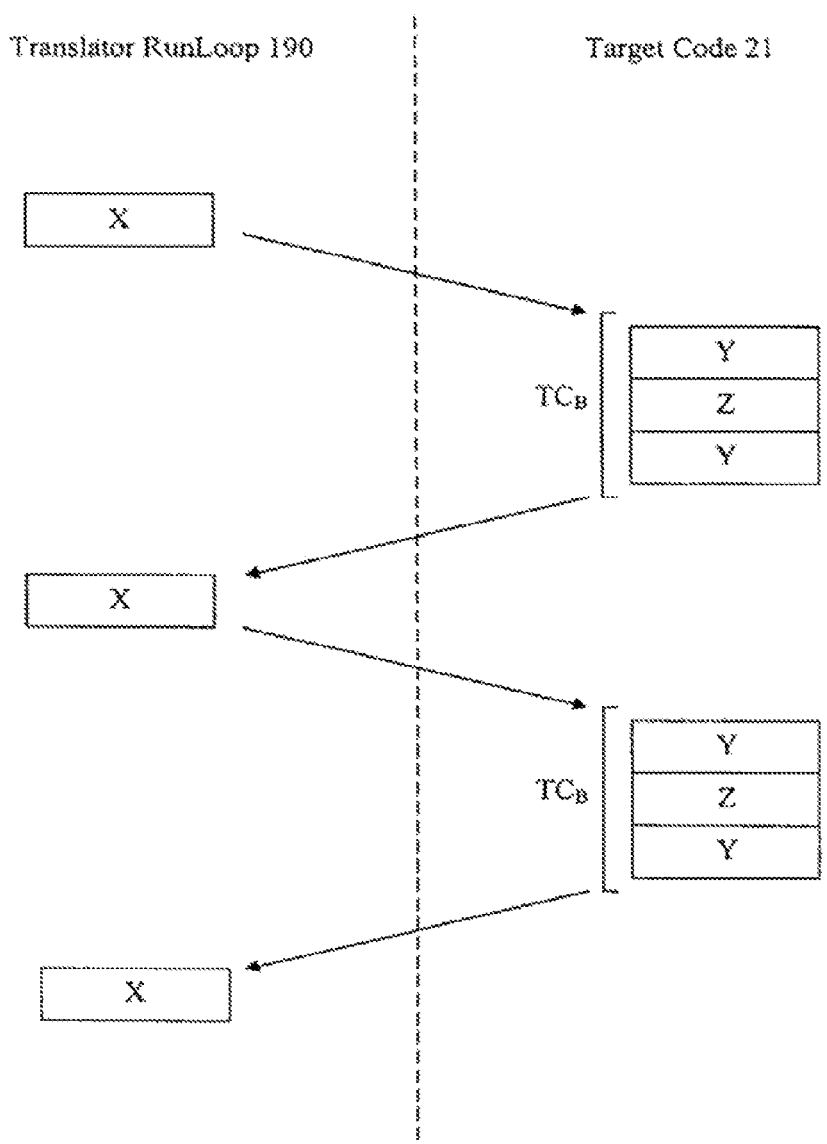
FIG. 5 illustrates workload distribution of the execution control method of FIGS. 2, 3 & 4.

FIG. 5 illustrates workload distribution of the example execution control method discussed above with reference to FIGS. 2, 3 & 4. The translator run loop 190 is in the left hand column, and execution of the target code 21 is in the right hand column. Work done by the run loop 190 is denoted by X. Work within each block (TC.sub.A, TC.sub.B, TC.sub.C) of target code 21 is denoted by Y as the overhead of the calling convention, such as register preservation and the passing of parameters, whereas Z represents the useful work of the relevant target code block (corresponding to the work of block A, B or C in the original subject program 17).

Referring to the simple subject program in FIG. 3, block B is repeatedly executed, but, as shown in FIG. 5, each execution of block B requires a context switch between the translator and the target execution, thus incurring significant overhead.

The preferred embodiments of the present invention provide an improved method of execution control during program code conversion, in particular by making context switching more efficient, by reducing overhead associated with context switching, and by reducing the occurrence of context switching.

Assembly Trampoline

Figure 6:
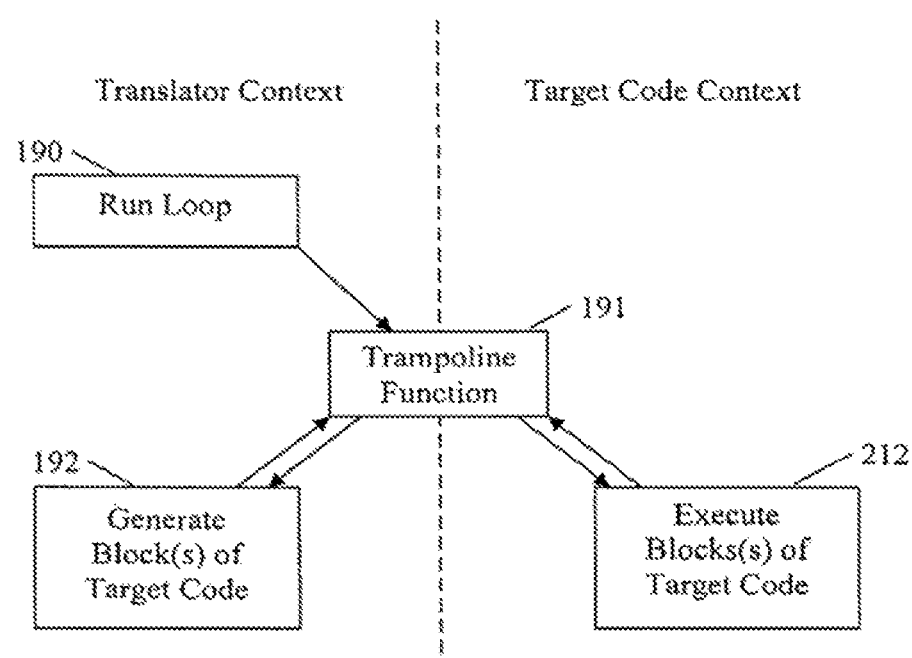
FIG. 6 is an overview of a preferred method of execution control during program code conversion.

FIG. 6 shows an overview of a method of controlling execution during program code conversion according to a first preferred aspect of the present invention.

As shown in FIG. 6, the translator run loop 190 makes calls into an assembly trampoline function 191, which in turn calls execution of a stored previously translated target code block 212 (TC.sub.A, TC.sub.B, TC.sub.C). Alternatively, the trampoline function 191 calls the translator code generator function 192 to generate the target code 21 from the stored subject program 17.

Figure 7:
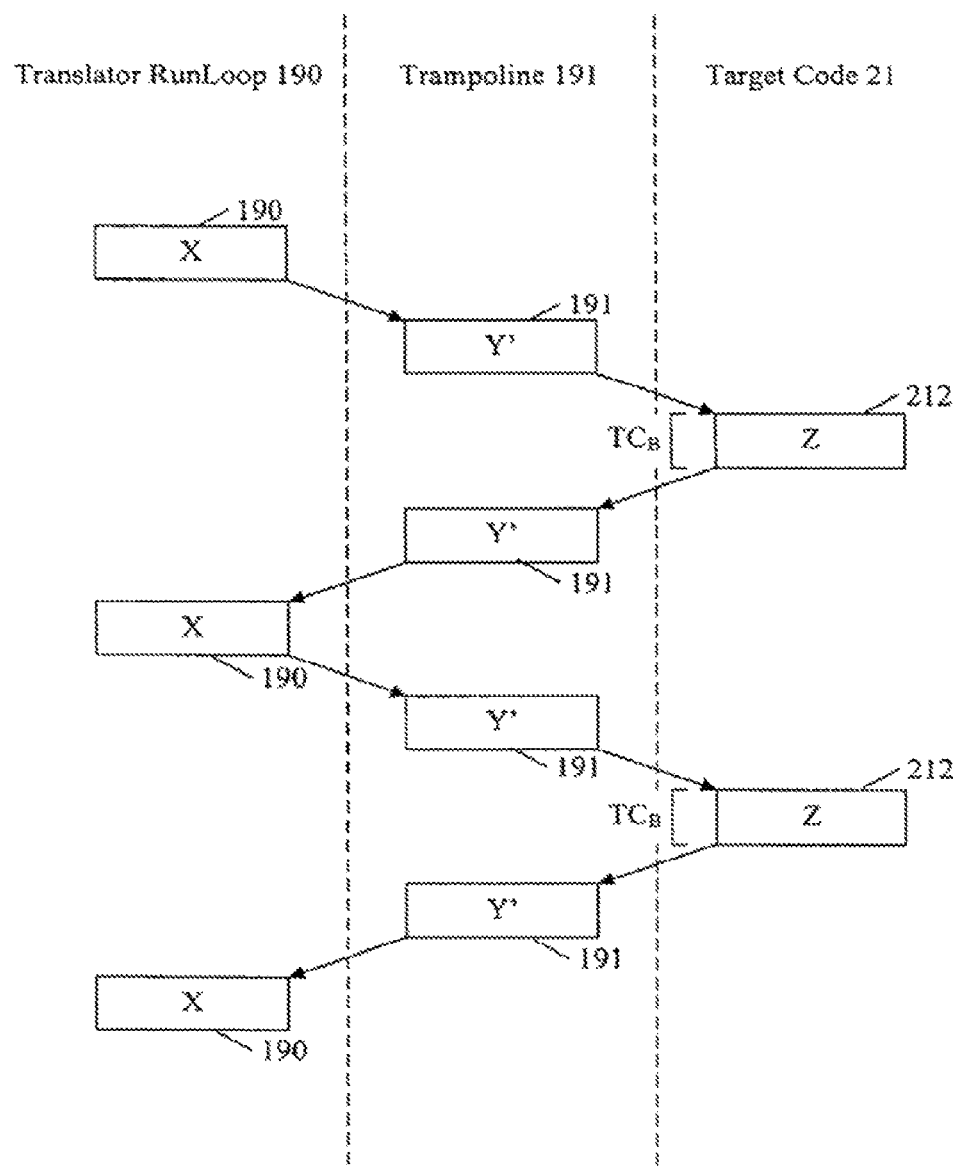
FIG. 7 illustrates workload distribution in the preferred method.

FIG. 7 illustrates workload distribution during program code conversion according to the first preferred aspect of the present invention.

As shown in FIG. 7, workload is distributed between the translator 19 and the target code 21. Work done by the run loop 190 is denoted by X, work by the trampoline function 191 is shown as Y', and work by the target code block 212 is shown as Z.

A pseudo-code example of the trampoline function 191 is shown below:

```
load block_identifier
call block_indentifier
```

The main task of the trampoline function 191 is to perform the context switch between the translator context and the target code context. In this example, the variable block_identifier is loaded into a register, and the register value then used as an address to call directly or indirectly and execute code stored at that address. The executed code can either be the previously translated target code 212, or the translator code generator function 192.

In providing the trampoline function 191, there is an immediate benefit by reducing the size of each target code block 212 stored in memory. That is, each block contains the useful instructions and minimal overhead. Further, each block is smaller and faster to produce, thus reducing work during translation.

Calling Conventions

FIG. 8 illustrates a preferred method employing first and second calling conventions during program code conversion.

The method comprises the steps of applying a first calling convention 71 during execution of the translator 19, and applying a second calling convention 72 during execution of the target code 21.

As shown in FIG. 8, in a first calling convention 71, a register is allocated a first predetermined role and assumes certain properties. In the second calling convention 72, the register is allocated a second, different role and assumes a different, second set of properties.

The trampoline function 191 comprises instructions to perform the calling convention switch from the first calling convention to the second calling convention. A pseudo-code example of the trampoline with calling convention switch instructions is shown below:

```
push ebx
push esi
push edi              //save callee preserved registers
load block_identifier
call block_indentifier //basic trampoline
pop edi
pop esi
popebx                //restore saved registers
```

Conveniently, the first calling convention 71 is observed appropriate to the instruction set architecture (ISA) of the target processor 13. This first calling convention defines one or more registers 15 which are callee preserved, and one or more registers which are caller preserved (scratch registers).

The translator 19 itself operates according to the first calling convention appropriate to the instruction set architecture of the target processor 13. However, the target code 21 is generated by the translator 19 according to the second calling convention, and thereby takes advantage of the alternate register roles and register preservations defined by the second calling convention.

Parameter Passing

Referring again to FIG. 7, the trampoline function 191 also provides a convenient mechanism to pass parameters into and out of each target code block TC.sub.A, TC.sub.B, TC.sub.C during execution thereof. In particular, it is useful to pass at least a first parameter denoting the current block of subject code under consideration (e.g. A, B or C). Also, it is helpful to pass one or more second parameters providing information about the subject processor state (such as a pointer to the abstract register bank 27).

Most conveniently, a parameter is passed into and/or out of each target code block using a register 15 of the target processor 13. This is achieved by selectively adhering to the first and second calling conventions 71, 72 at appropriate times, in order to pass the parameter values stored in these one or more registers 15.

A pseudo-code example of the trampoline with calling convention switch instructions and with parameter passing is shown below:

```
push ebx
push esi
push edi
load block_identifier, EAX
call block_indentifier
push ebp
call EAX
```

```
pop ebp
pop edi
pop esi
popebx
```

In this particular example, in a first calling convention 71 for an X86 processor, register ebp stores the stack base pointer. In the preferred second calling convention 72, ebp instead stores a pointer to the abstract register bank 27, which is contrary to the assumptions for that register in the first calling convention 71.

Passing a parameter in one of the target registers 15 has a number of advantages. Firstly, save/restore operations are avoided. Secondly, it is generally much faster for a processor to retrieve a value from a register compared with a memory access to a stack, cache or long-term memory.

Processor Mode Switching

Optionally, a processor mode switch is performed during each context switch. That is, the trampoline function 191 preferably further comprises instructions to perform the processor mode switch.

As an example, some processors are able to operate in either a little-endian or a big-endian byte ordering mode. A processor mode switch is performed during the context switch to set the little- or big-endian mode appropriate for the target code execution, and a contrary mode is set for the translator execution.

There are practical advantages in performing a processor mode switch, particularly where the target processor provides an alternate operating mode which better reflects the needs of a subject program which has been written for a particular subject processor mode. As will be familiar to persons skilled in the art, changing processor mode is accomplished with a set of instructions that will set a mode flag, or other processor control arrangement, as appropriate to the specific target processor.

Trampoline Block Jumping

Figure 9:
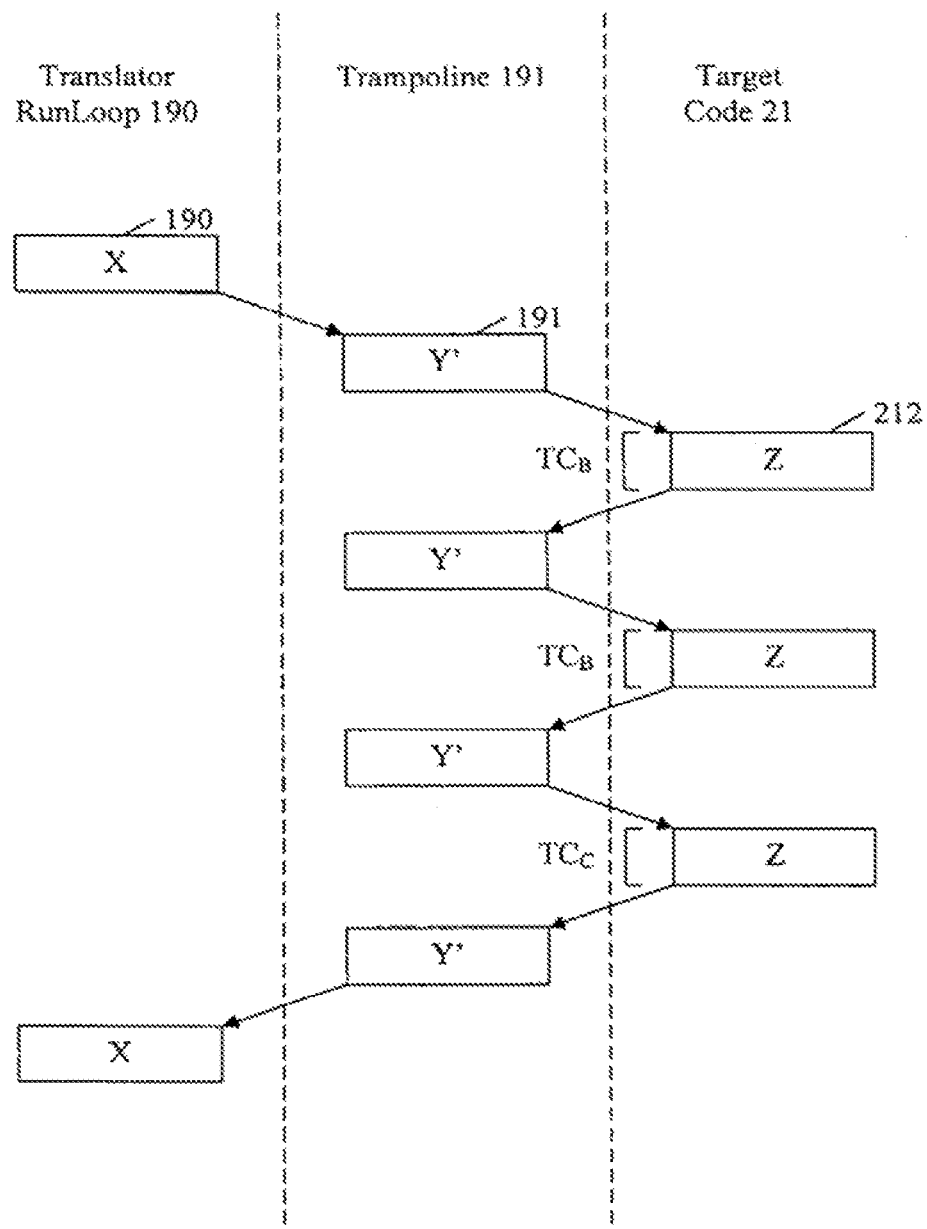
FIG. 9 illustrates another preferred method of execution control during program code conversion.

FIG. 9 shows a further preferred embodiment of a method of execution control during program code conversion.

Referring to FIG. 9, each block of target code 212 terminates with an instruction or instructions passing control back to the trampoline function 191. Here, a further enhancement allows a current block of target code 212 (e.g. TC.sub.B) to indirectly reference a subsequent block of target code (e.g. TC.sub.B or TC.sub.C) through the trampoline function 191.

Referring again to the simple looping structure of the program of FIG. 3, for illustration we assume that block B terminates with a jump, either returning to the beginning of block B or else continuing to block C.

As shown in FIG. 9, trampoline block jumping allows program execution to jump from the current block (TC.sub.B) to the next block (TC.sub.B or TC.sub.C) through the assembly code trampoline 191 and without returning to the run loop 190. This presents a significant saving by avoiding context switching and remaining within the target code execution context. In a preferred embodiment, each block of target code 212 is generated with a tail which provides a linking parameter (such as a variable "block_identifier") which links to a stored block object containing code of a subsequent target code block or containing a link to a stored subsequent target code block. The trampoline function 191 receives this block linking parameter and thereby calls the subsequent block of target code.

Figure 10:
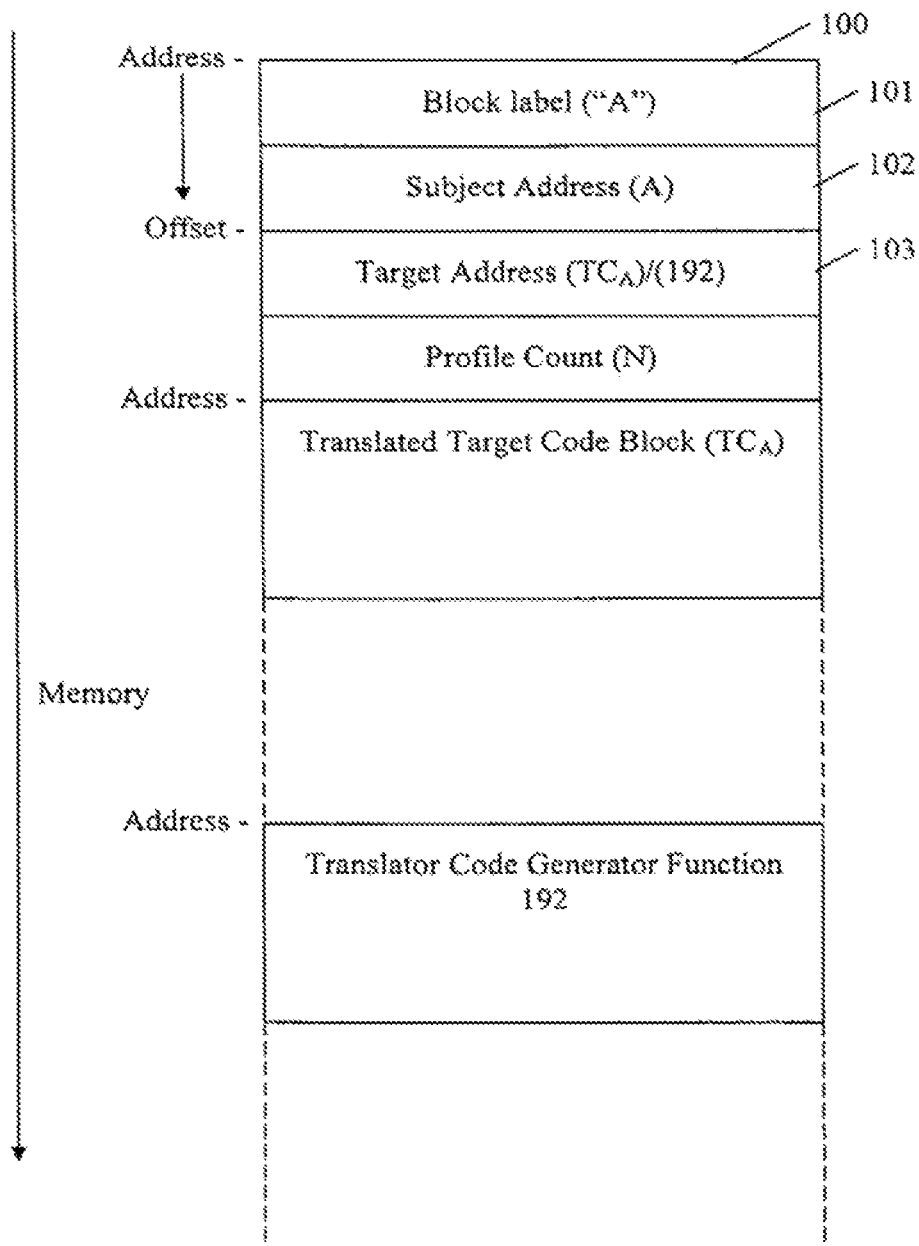
FIG. 10 shows an example stored block object as employed in preferred embodiments of the present invention.

A preferred form of a stored block object is shown in FIG. 10. Each block object 100 comprises a block label 101 (e.g. "A", "B" or "C"), a subject address 102 of a corresponding block of source code 17, and a target address 103. The target address 103 refers either to the target code block (TC.sub.A, TC.sub.B, TC.sub.C) if available, or else refers to the target code generator 192. Hence, a jump to the stored target address 103 allows execution either of the target code or the code generator function as appropriate.

Target Code Jumping

Figure 11:
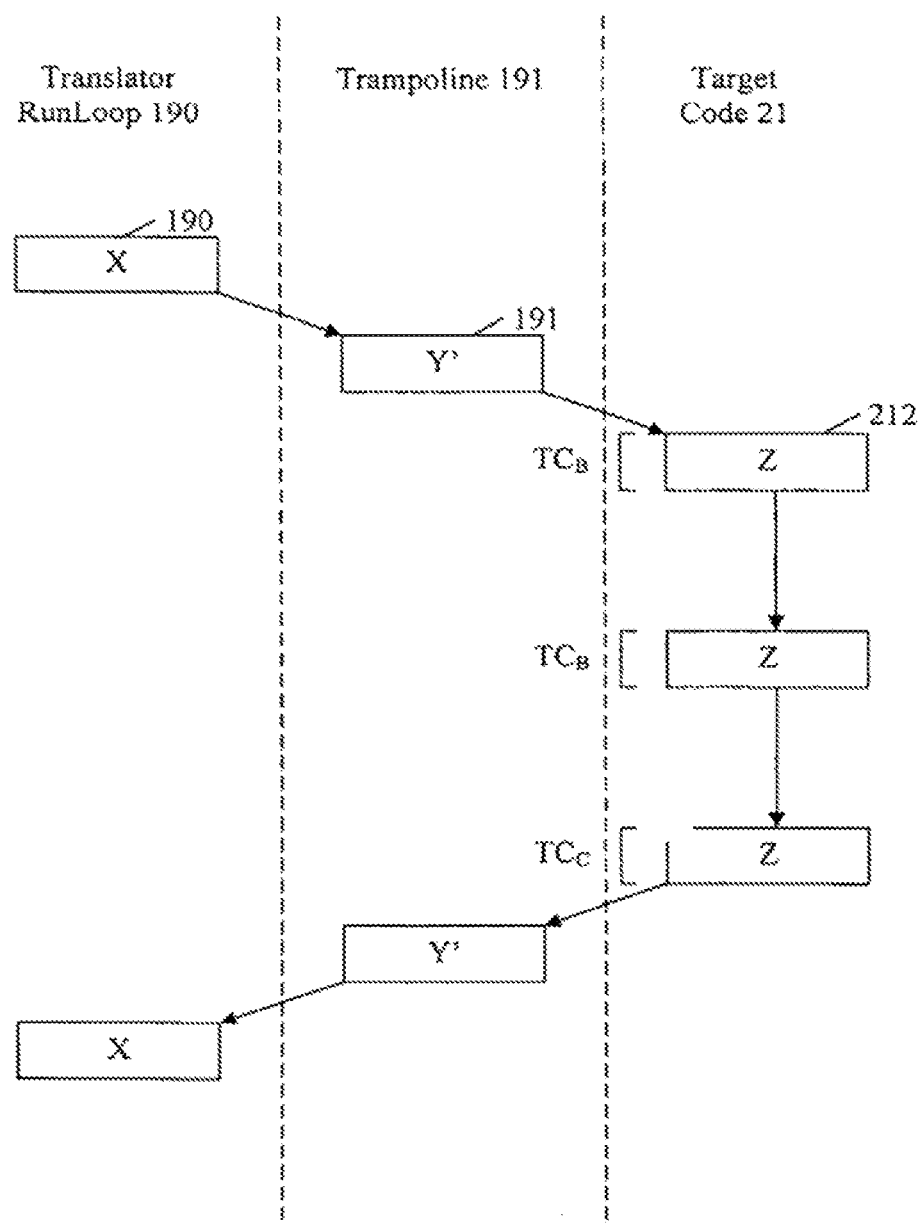
FIG. 11 illustrates yet another preferred method of execution control during program code conversion.

FIG. 11 shows a further preferred embodiment of a method of execution control during program code conversion.

Referring to FIG. 11, each block 212 of target code terminates with a tail instruction or instructions which link from the current block (TC.sub.B) to a subsequent block (TC.sub.B or TC.sub.C), without reverting to the trampoline function 191.

The tail preferably comprises a jump instruction which performs an indirect jump based upon a value loaded from memory. A pseudo-code example of the target code tail is shown below:

jmp*offset(block_identifier)

A jump is performed according to a value of a stored linking parameter, here called "block_identifier". The stored variable points to a memory address storing a subsequent block object to be executed next. The block object stores the translated target code, or contains an address pointer for the target code.

In a particularly preferred embodiment, the linking parameter is provided in one of the target registers 15. Again, an example tail instruction is shown below:

jmp*offset (eax)

In this example, the variable block_identifier is stored the register EAX of an x86 processor. The tail instruction is modified to reference the register EAX, which contains the linking parameter. Jumping to the memory address contained in the register EAX links to a stored object representing a block of code to be executed next. Also, the value in the register EAX is retained in order to denote the current block of the subject program under consideration. That is, the linking parameter preferably denotes block A, B, or C of the subject program, which is useful during execution of the corresponding target code.

Lightweight Profiling Check

Figure 12:
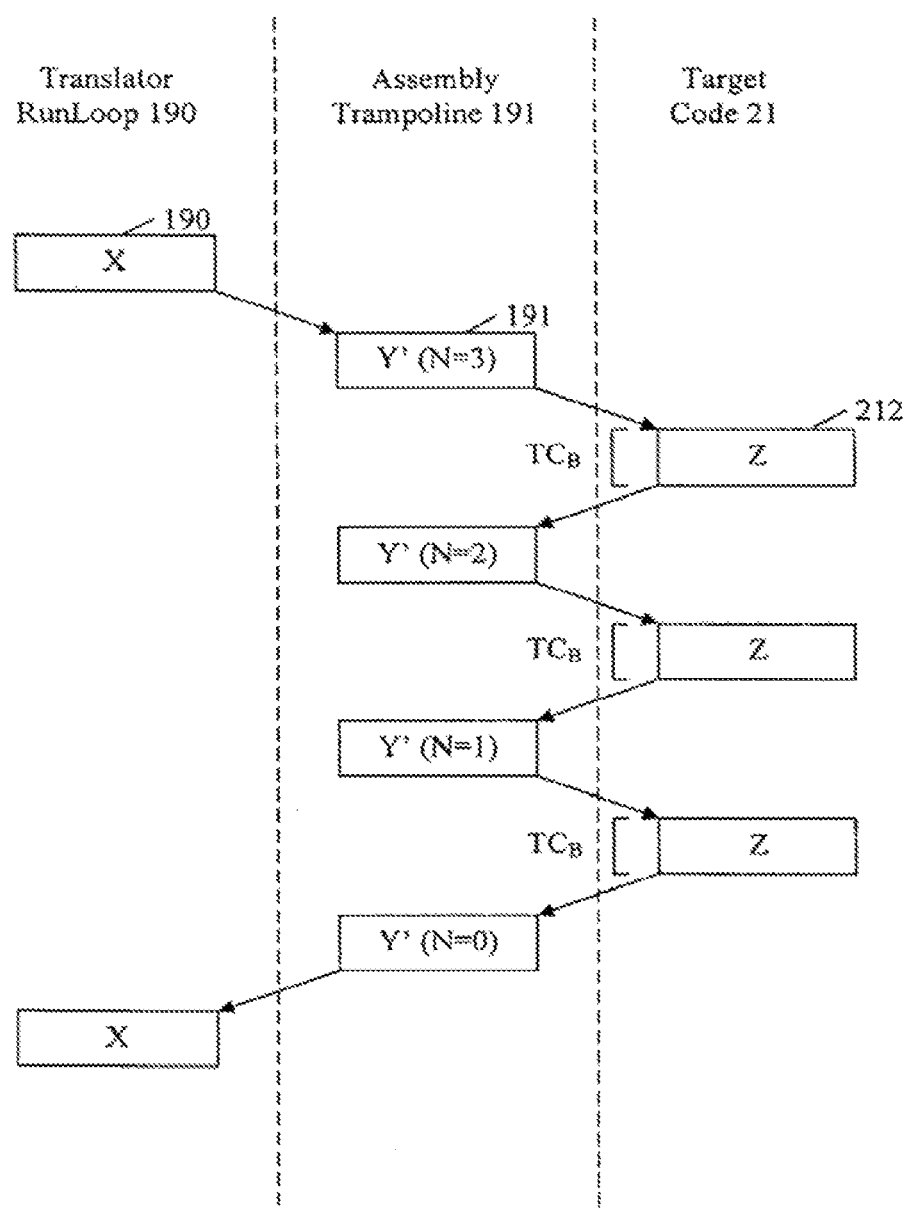
FIG. 12 shows a preferred execution control method including a lightweight profiling check.

FIG. 12 shows yet another preferred aspect of the execution control method, by providing a lightweight profiling check.

In a first embodiment similar to FIG. 9 discussed above, a decision is taken within the trampoline function 191 whether to remain in the target code execution context (second calling convention and corresponding processor mode), or else return to the run loop 190 and restore the translator context (first calling convention and first processor mode).

This decision is important in practice since the translator is able to make many optimizations during execution of the subject code 17, which may call for modification or substitution of the translated code 21. Returning control to the run loop 190 then allows these optimization decisions to take place.

A particularly preferred mechanism allocates an execution limit to each target code block 212. That is, each target code block is executed no more than N times before returning control to the run loop, where N is an integer. Conveniently, a counter counts up to the threshold value N, which is set by the translator 19 upon creation of the target code block 212. A further cost saving is achieved by instead counting down to zero from the threshold value N. This allows a "jump less than or equal to zero" type instruction which is more efficient to execute in many processor architectures.

Referring again to FIG. 10, in the preferred embodiment each block 100 of target code is generated including a profile count 104 to store the current value of the counter N.

The lightweight profiling check is provided in the trampoline function 191 as illustrated by the follow pseudo-code example:

```
        push ebx
        push esi
        push edi
        load block_identifier, eax
        push ebp
    1:
        dec offset (eax)
        jz 2:
        call eax
        jmp 1
    2:
        pop ebp
        pop edi
        pop esi
        popebx
```

In this example the jz (jump if equal to zero) instruction bypasses the call, if the counter has already reached zero.

Figure 13:
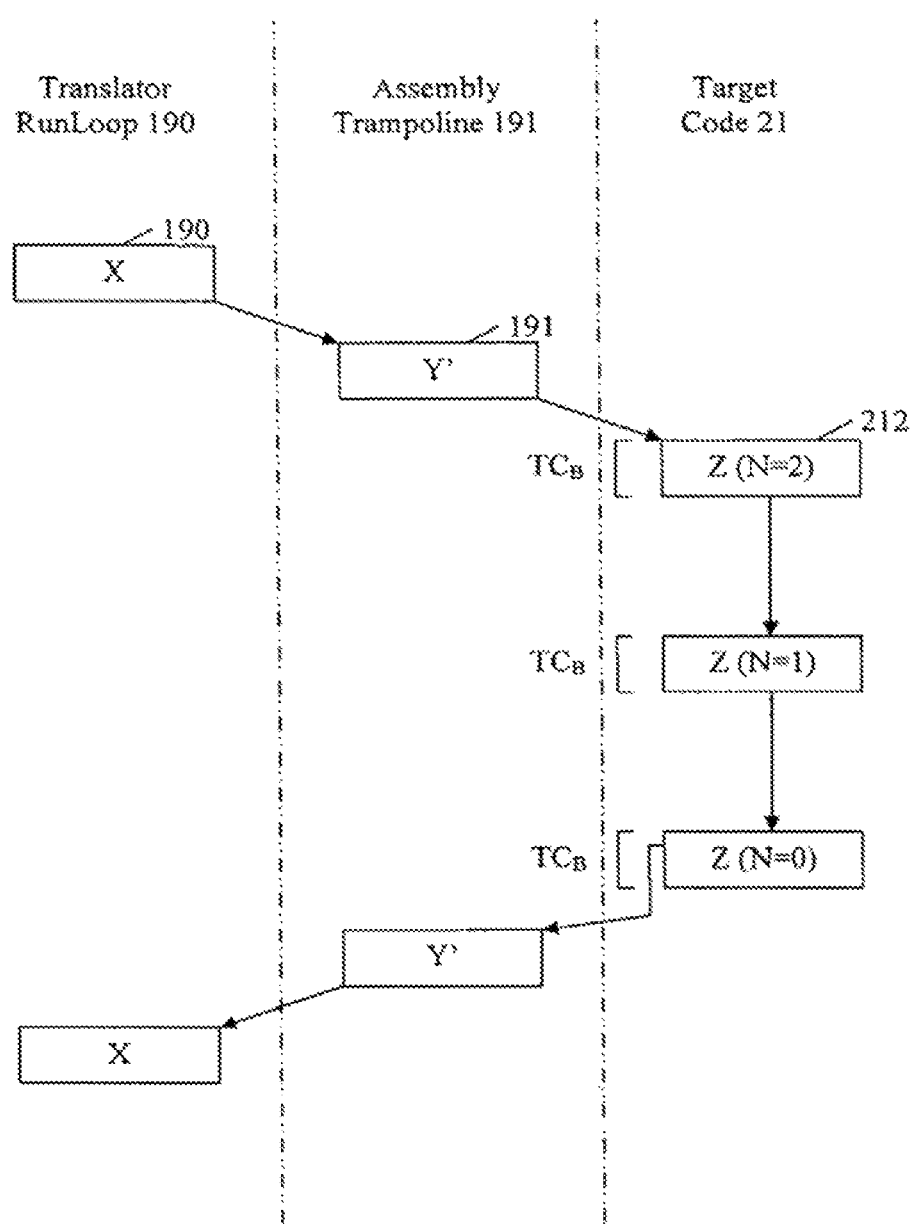
FIG. 13 shows another preferred execution control method including a lightweight profiling check.

FIG. 13 shows yet another preferred aspect of the lightweight profiling check, appropriate to the embodiment discussed above with reference to FIG. 11.

Here, the profiling check is performed within the target code block 191. A threshold is set and reduced to zero over subsequent iterations. Preferably the check is performed upon entry into the target code block with instructions such as in the following example:

```
        dec offset (block identifier)
        jnz 1:
        ret
    1:
```

Where the threshold is reached (e.g. at zero) control returns to the trampoline function 191 to perform appropriate actions, such as a context switch back to the translator run loop 190.

Nested Control Loops

Figure 14:
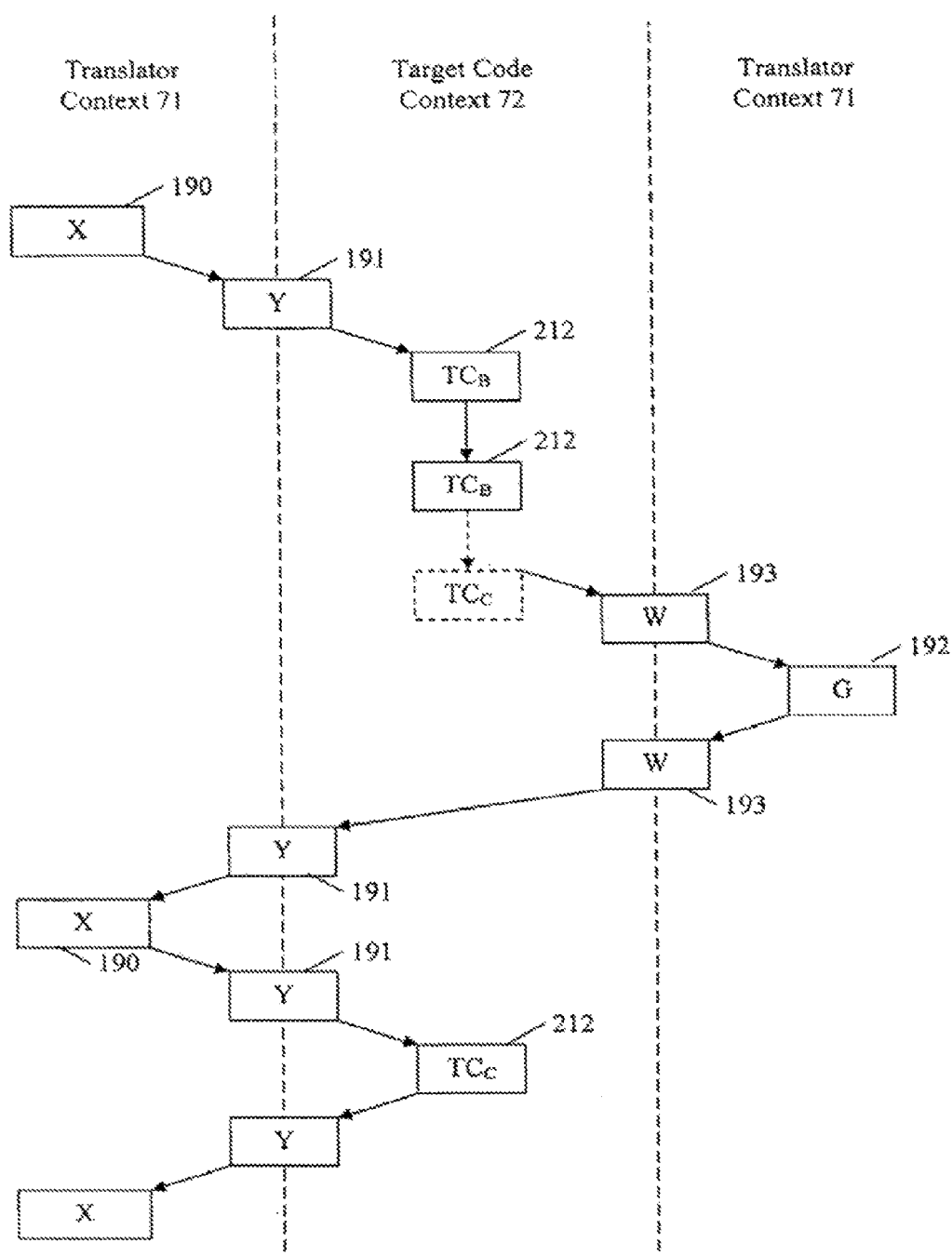
FIG. 14 shows another preferred method of execution control during program code conversion, employing nested control loops.

FIG. 14 shows another preferred method of execution control during program code conversion, which employs nested control loops.

As shown in FIG. 14, a nested form of execution control provides a convenient mechanism to call the translator code generator function 192. Here, block jumping is performed as discussed above in FIGS. 9 and 11. Hence, the tail of target code block TC.sub.B tries to jump to block TC.sub.C, which has not yet been generated. Instead, the block object C contains a redirection such that execution passes to a second trampoline function 193, which calls the translator generator function 192. The target code block TC.sub.C is then generated from the corresponding subject code block C. Returning through the trampoline function 193, and then through the first trampoline function 191, control then returns to the run loop 190. The target code block TC.sub.C is then called through the first trampoline function 191.

The first and second trampoline functions 191, 193 are very similar and may share the same code, but have been shown separately in FIG. 14 for clarity.

FIG. 14 also shows context switching between the translator context and the target code context. The trampoline functions 191, 193 each perform the context switch into and out of the target code context, including changing between the first and second calling conventions 71, 72. Hence the trampolines 191, 193 are each shown straddling the first and second contexts.

The second trampoline function 193 nests the context switches into and out of the translator context 71 to run the code generator 192. The first trampoline function then unpicks the original context switch to return to the top-level of run loop 190. The double bounce through the first and second trampolines 191, 193 allows parameters and other data to be stored to the stack and then properly restored in the correct order. As discussed above, each context switch requires register save or restore operations, conveniently using a push or pop of a LIFO stack.

Most often, the subject program 17 requires small areas of code to be executed repeatedly, whilst major portions are executed rarely if at all. For example, the subject program is a spreadsheet or word processor program where only relatively few of the many available functions or commands are used frequently. Hence, in a dynamic binary translator, target code execution occurs much more frequently than translation. The preferred execution control method of FIG. 14 adds overhead in the second trampoline function 193, but is optimized for execution of the translated code 21.

Each of the aspects described above can be employed in isolation. However, significant benefits are achieved by a synergistic combination of these mechanisms. That is, by combining any one or more of context switches through a trampoline function, first and second calling conventions, block jumps, lightweight profiling check and nested control loops, significant savings are made in the execution of the subject code 17 through the translator 19.

As a practical example, under preferred implementations of the present invention, execution is two to three times faster with the enhancements as described herein. This is a significant boost to performance of the translator 19.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any

We claim:
1. A method of execution control for use during program code conversion of a subject program into target code executable by a target processor, the method comprising:
(a) providing a translator run loop which sets a subject block in the subject program as a current subject block;
(b) calling a first translator trampoline function from the translator run loop;
(c) without returning to the translator run loop, calling from the first translator trampoline function either to a translator code generator function to generate and store a target code block from the current subject block, or else calling and executing a previously stored target code block corresponding to the current subject block;
(d) returning, from the executing without returning to the translator run loop, to the first translator trampoline function and repeating (c) for another subject block, or else returning from the first translator trampoline function to the translator run loop;
(e) retuning from execution of target code to the first translator trampoline function;
(f) calling from the execution of target code to a nested second translator trampoline function;
(g) returning from the nested second translator trampoline function to the first translator trampoline function;
(h) calling from the first translator trampoline function to the target code execution; and
(i) in the first translator trampoline function, performing a context switch from the first calling convention to the second calling convention when switching between the target code execution and the nested second translator trampoline function execution, and vice versa;
wherein the nested second translator trampoline function includes the translator code generator function to generate a block of target code from a corresponding block of the subject program.

2. The method of claim 1, further comprising:
applying a first calling convention at least during translator execution including, execution of the translator run loop and the translator code generator function; and
applying a second calling convention during execution of the target code.

3. The method of claim 2, further comprising:
allocating to a register of the target processor a first predetermined role and a first register preservation property in the first calling convention; and
allocating to the register of the target processor a second predetermined role and a second register preservation property in the second calling convention.

4. The method of claim 2, further comprising:
performing a switch in the first translator trampoline function from the first calling convention to the second calling convention when switching between the translator execution and the target code execution, or vice versa.

5. The method of claim 4, comprising applying the first calling convention appropriate to an instruction set architecture of the target processor.

6. The method of claim 4, wherein the first calling convention defines a first set of register roles and preservation properties, including canoe preserved and caller preserved registers; and the second calling convention defines a second set of register roles and preservation properties different from the first set.

7. The method of claim 2, further comprising:
applying the first calling convention appropriate to an instruction set architecture of the target processor when executing the translator code generator function; and
generating the target code in the translator code generator function, to operate according to the second calling convention.

8. The method of claim 1, further comprising passing one or more parameters to or from the target code generator function and/or to or from the block of target code being executed.

9. The method of claim 8, wherein the one or more parameters comprise at least a first parameter denoting the current block under consideration, and one or more second parameters providing information about a subject processor state.

10. The method of claim 1, further comprising passing a parameter into and/or out of each target code block using a register of the target processor.

11. The method of claim 2, wherein the second calling convention allocates a parameter passing role to at least one target register of the target processor.

12. The method of claim 1, further comprising performing a processor mode switch in the first translator trampoline function to switch a mode of the target processor.

13. The method of claim 12, comprising setting the target processor to a first mode at least during execution of the translator code generator function, and setting the target processor to a second mode at least during execution of the target code block.

14. The method of claim 1, further comprising indirectly linking from a current block of target code to a subsequent block of target code through the first translator trampoline function.

15. The method of claim 14, further comprising:
generating each block of target code with a tail which provides a linking parameter which links to a stored block object containing code of a target code block or containing a link to a stored target code block; and
in the first translator trampoline function, receiving the block linking parameter from the current block and thereby calling the subsequent block of target code.

16. The method of claim 14, further comprising performing a profiling check for each target code block by deciding within the first translator trampoline function whether to remain in a target code execution context, or else restore a translator context and return to the translator run loop.

17. The method of claim 1, further comprising generating each block of target code with a tail which indirectly links from the current target code block to a subsequent block of target code, without reverting to the first translator trampoline function.

18. The method of claim 17, wherein the tail comprises a jump instruction which performs an indirect jump based upon a linking parameter stored in memory.

19. A non-transitory computer-readable storage medium having software resident thereon in the form of computer-readable code executable by a computer to perform a method of execution control for use during program code conversion of a subject program into target code executable by a target processor, said method comprising:
(a) providing a translator run loop which sets a subject block in the subject program as a current subject block;
(b) calling a first translator trampoline function from the translator run loop;
(c) without returning to the translator run loop, calling from the first translator trampoline function either to a translator code generator function to generate and store a target code block from the current subject block, or else calling and executing a previously stored target code block corresponding to the current subject block;

(d) returning, from the executing without returning to the translator run loop, to the first translator trampoline function and repeating (c) for another subject block, or else returning from the first translator trampoline function to the translator run loop;
(e) returning from execution of target code to the first translator trampoline function;
(f) calling from the execution of target code to a nested second translator trampoline function;
(g) returning from the nested second translator trampoline function to the first translator trampoline function;
(h) calling from the first translator trampoline function to the target code execution; and
(i) in the first translator trampoline function, performing, a context switch from the first calling convention to the second calling convention when switching between the target code execution and the nested second translator trampoline execution, and vice versa;
wherein the nested second translator trampoline function includes the translator code generator function to generate a block of target code from a corresponding block of the subject program.

20. An apparatus, comprising:
a target processor; and
translator code to perform program code conversion of a subject program into target code executable by the target processor, including performing:
  (a) providing a translator run loop which sets a subject block in the subject program as a current subject block;
  (b) calling a first translator trampoline function from the translator run loop;
  (c) without returning to the translator run loop, calling from the first translator trampoline function either to a translator code generator function to generate and store as target code block from the current subject block, or else calling and executing a previously stored target code block corresponding to the current subject block;
  (d) returning, from the executing without returning to the translator run loop, to the first translator trampoline function and repeating (c) for another subject block, or else returning from the first translator trampoline function to the translator run loop;
  (e) returning from execution of target code to the first translator trampoline function;
  (f) calling from the execution of target code to a nested second translator trampoline function;
  (g) returning from the nested second translator trampoline function to the first translator trampoline function;
  (h) calling from the first translator trampoline function to the target code execution; and
  (i) in the first translator trampoline function, performing a context switch from the first calling convention to the second calling convention when switching between the target code execution and the nested translator execution, and vice versa;
wherein the nested second translator trampoline function includes the translator code generator function to generate a block of target code from a corresponding block of the subject program.

* * * * *